(12) United States Patent
Ke (10) Patent No.: US 10,260,641 B2
(45) Date of Patent: Apr. 16, 2019

(54) SELF-COMPENSATED SEALED ROTARY CONE VALVE CORE AND COMPLETE ASSEMBLY VALVE

(71) Applicant: Fujian Huayong Technology Co., Ltd, Fuzhou (CN)

(72) Inventor: Zhenming Ke, Fuzhou (CN)

(73) Assignee: Fujian Huayong Technology Co., Ltd., Fuzhou (CN)

( * ) Notice: Subject to any disclaimer, the term of this patent is extended or adjusted under 35 U.S.C. 154(b) by 210 days.

(21) Appl. No.: 15/520,757

(22) PCT Filed: Nov. 11, 2014

(86) PCT No.: PCT/CN2014/090805
§ 371 (c)(1),
(2) Date: Apr. 20, 2017

(87) PCT Pub. No.: WO2016/061857
PCT Pub. Date: Apr. 28, 2016

(65) Prior Publication Data
US 2018/0306330 A1    Oct. 25, 2018

(30) Foreign Application Priority Data
Oct. 24, 2014    (CN) .......................... 2014 1 0572903

(51) Int. Cl.
*F16K 1/38* (2006.01)
*F16K 5/02* (2006.01)
(Continued)

(52) U.S. Cl.
CPC .................. *F16K 1/38* (2013.01); *F16K 1/42* (2013.01); *F16K 5/02* (2013.01); *F16K 5/025* (2013.01); *F16K 5/0214* (2013.01); *F16K 1/2268* (2013.01)

(58) Field of Classification Search
CPC .......... F16K 1/38; F16K 5/025; F16K 5/0214; F16K 1/42; F16K 5/02; F16K 1/2268
(Continued)

(56) References Cited

U.S. PATENT DOCUMENTS 305,948 A * 9/1884 Mittelstenscheid ... F16K 5/0214
                                                      251/183
730,332 A * 6/1903 Andrews ............... F16K 5/0214
                                                      251/183
(Continued)

FOREIGN PATENT DOCUMENTS

CN    85205799 U    10/1986
CN    87215297 U    11/1988
(Continued)

*Primary Examiner* — John Bastianelli
(74) *Attorney, Agent, or Firm* — Wayne & Ken, LLC; Tony Hom (57) ABSTRACT

A self-compensated sealed rotary cone valve core, comprising a valve sleeve, wherein an upper part of the valve sleeve is provided with an axial through hole; a lower chamber of the valve sleeve is provided with a conical surface coaxial with the axial through hole; an inlet cavity is formed in the cone platform; a through hole communicated with a water outlet in a side wall of the lower part of the valve sleeve is formed in a side wall of the inlet cavity; a screw rod part of the core shaft penetrating through the valve sleeve is sequentially sleeved by a limiting piece and a spring gasket and is locked by a screw nut to realize pre-tightening sealing and rotary positioning with the valve sleeve. The valve core is simple in structure and convenient to process and mount, self-sealing and wear self-compensation can be achieved.

4 Claims, 6 Drawing Sheets

(51) Int. Cl.
*F16K 1/42* (2006.01)
*F16K 1/226* (2006.01)

(58) Field of Classification Search
USPC .......................................... 251/209, 309–312
See application file for complete search history.

(56) References Cited

U.S. PATENT DOCUMENTS

| | | | | |
|---|---|---|---|---|
| 1,430,361 A | * | 9/1922 | Cullison | ............... F16K 5/0214 |
| | | | | 251/188 |
| 1,724,686 A | * | 8/1929 | Snebold | ................ F16K 5/0214 |
| | | | | 137/246.14 |
| 2005/0017210 A1 | | 1/2005 | Home | |

FOREIGN PATENT DOCUMENTS

| | | | |
|---|---|---|---|
| CN | 2064845 | U | 10/1990 |
| CN | 2233490 | A | 8/1996 |
| CN | 2334962 | Y | 8/1999 |
| CN | 2355175 | Y | 12/1999 |
| CN | 201382713 | Y | 1/2010 |
| CN | 202065495 | U | 12/2011 |
| CN | 203784343 | U | 8/2014 |
| CN | 204213366 | U | 3/2015 |
| GB | 2132317 | A | 7/1984 |

* cited by examiner

SELF-COMPENSATED SEALED ROTARY CONE VALVE CORE AND COMPLETE ASSEMBLY VALVE

TECHNICAL FIELD

The present invention relates to a valve core, in particular to a self-compensated sealed rotary cone valve core and a complete assembly valve.

BACKGROUND OF THE INVENTION

Existing industrial valve cores or common valve cores generally have more or less defects; for example, for the most commonly used valve core of a ball valve, its working principle and structure determine that fluid is bound to be retained in chambers of a valve core and a valve body in a closed state to cause hidden health or safety hazards; when the ball valve is applied to a drinking water system, the retained water affects human health; on the other hand, since a ball body and a sealing pair are continuously worn during use, sealing performance of the ball valve may be reduced continuously, thereby reducing its service life; and once the valve body or the valve core is damaged, the whole ball valve must be removed from a pipeline for replacement and maintenance, resulting in high maintenance cost of a conveying system. Thus, a novel valve core structure is required.

SUMMARY OF THE INVENTION

In order to solve defects of existing valves, the present invention provides a self-compensated sealed rotary cone valve core which is simple in structure, convenient in complete processing, installation and maintenance, and capable of realizing self-sealing and automatic wear compensation.

The present invention adopts the following technical solution: a self-compensated sealed rotary cone valve core comprises a valve sleeve; an upper part of the valve sleeve is provided with an axial through hole; a lower chamber of the valve sleeve is provided with a conical surface coaxial with the axial through hole; a core shaft penetrating through the axial through hole from bottom to top is arranged in the valve sleeve; a lower part of the core shaft is provided with a cone platform closely matched with the conical surface; an inlet cavity is formed in the cone platform; a through hole communicated with a water outlet in a side wall of the lower part of the valve sleeve is formed in a side wall of the inlet cavity; and a screw rod part of the core shaft penetrating through the valve sleeve is locked by a screw nut to realize pre-tightening sealing and rotary positioning with the valve sleeve.

Further, the valve sleeve is composed of a core cover and a core base connected under the core cover; an axial through hole is formed in the upper part of the core cover; the lower part of the axial through hole is provided with a reamed hole; an aperture of the reamed hole is greater than a diameter of an upper platform surface of the cone platform of the core shaft so that the core shaft is automatically moved up after a sealing surface between the conical surface and the cone platform is worn; a rectangular bump is arranged at the lower part of the core cover; a conical through hole coaxial with the axial through hole is formed in the core base in an axial direction; the water outlet is formed in the side wall of the core base; and a rectangular groove matched with the rectangular bump of the core cover is further formed in an upper end surface of the core base.

Further, the core shaft is a rigid whole member; and the screw rod part of the core shaft penetrating through the valve sleeve is sequentially sleeved by a limiting piece and a spring gasket and is locked by the screw nut to realize the rotary positioning with the valve sleeve.

Further, the core base is made of plastics to form soft sealing with the cone platform of the core shaft, or the core base is made of a rigid material to form hard sealing with the cone platform of the core shaft.

A straight-through valve comprises a rotary cone valve core and a valve body arranged outside the rotary cone valve core; the valve body is provided with an inlet, an outlet and a vertical mounting hole; and the rotary cone valve core is completely assembled in the vertical mounting hole so that the inlet of the valve body is communicated with a water outlet and the outlet of the valve body through an inlet cavity of the rotary cone valve core.

An angle valve comprises a rotary cone valve core and a valve body; the valve body is provided with an inlet, an outlet with a corner turning down at 90 degrees, and a laterally formed mounting hole; the rotary cone valve core is completely assembled in the mounting hole; and a water outlet of the rotary cone valve core faces the outlet of the valve body.

A straight-way valve comprises a rotary cone valve core and a valve body; the valve body is provided with a linear inlet and outlet channel; an oblique mounting hole communicated with the inlet and outlet channel is formed in the valve body; the rotary cone valve core is completely assembled in the oblique mounting hole; and a water outlet of the rotary cone valve core and the inlet and outlet channel of the valve body are located on the same central axial line.

A faucet comprises a rotary cone valve core and a valve body; the valve body is provided with an inlet, an outlet and a vertical mounting hole communicated with the inlet and the outlet; and the rotary cone valve core is completely assembled in the vertical mounting hole.

Compared with the prior art, the present invention has the following advantages: (1) The valve core not only is simple in structure and easy in processing technology, but also is easy in complete assembly and long in service life; (2) the core shaft and the core base of the valve core are in matched sealing through the conical surface; and during use, the pre-tightening force of the spring gasket and the pressure of the fluid enable the core shaft to automatically move up after the sealing surface is worn, thereby realizing automatic wear compensation; (3) the valve core has good sealing performance; the mutual friction of the core shaft and the core base during use enables a binding surface between the core shaft and the core base to be smoother, so that the valve core realizes self-sealing under the action of the pre-tightening force and the pressure of the fluid and has a characteristic that the more the wear is, the better the sealing performance is; (4) the valve core is wide in application range, can be processed and completely assembled into different specifications as a faucet valve core, and can also be completely assembled on various types of valve bodies; (5) the valve core and the valve body are assembled into a valve; and the valve has no any fluid retention cavity gap in the closed state, thereby eliminating hidden health and safety risks; and (6) forms of soft sealing and hard sealing can be formed on the basis of materials of the valve base; and the valve core is suitable for various environmental conditions from low temperature to high temperature and from low pressure to high pressure, and has performance better than that of the ball valve.

BRIEF DESCRIPTION OF DRAWINGS

In the figures, 1—core cover, 11—rectangular bump, 12—reamed hole, 2—core base, 21—water outlet, 22—rectangular groove, 3—core shaft, 31—cone platform, 311—inlet cavity, 32—through hole, 4—screw nut, 5—limiting piece, 6—spring gasket, 7—valve body, 71—inlet of the valve body, 72—outlet of the valve body, 73—upward-turning chamber, 74—inlet and outlet channel and 8—rotary cone valve core.

DETAILED DESCRIPTION OF THE INVENTION

In order to make the above characteristics and advantages of the present invention more apparent and understandable, the present invention is described below in detail by particularly giving embodiments in combination with drawings; but the present invention is not limited thereto.

Figure 1:
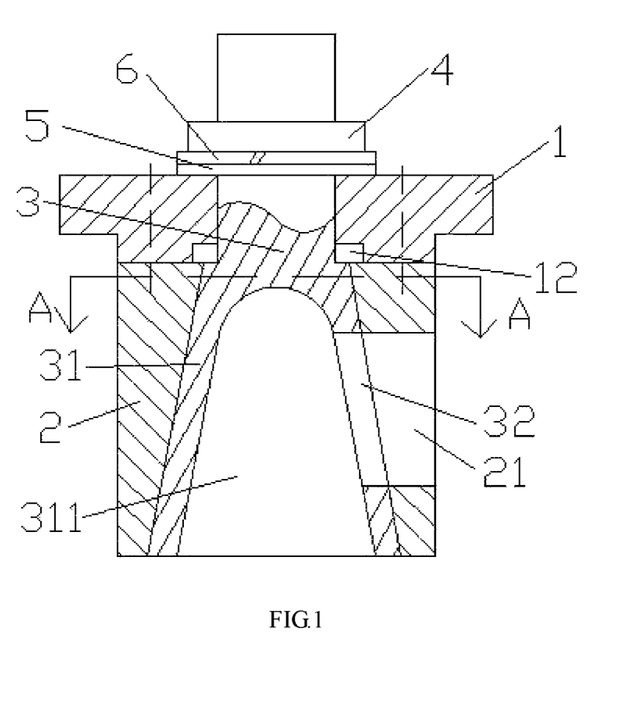
FIG. 1 is a structural schematic diagram of a valve core according to the present invention.
Figure 2:
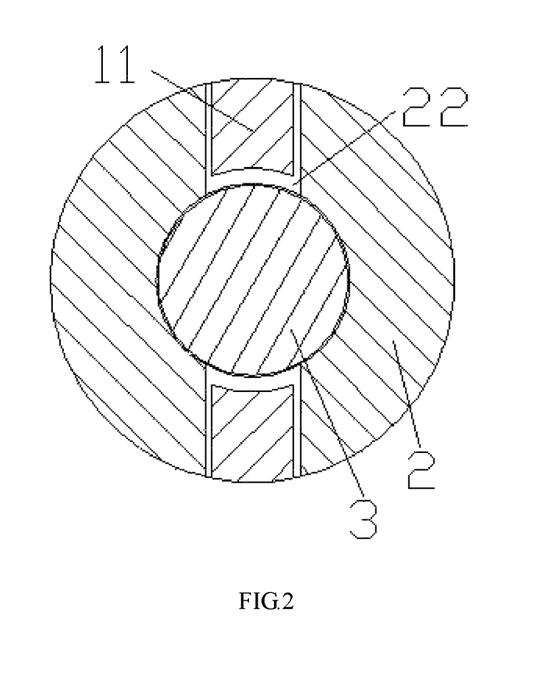
FIG. 2 is a sectional view of A-A in FIG. 1 according to the present invention.

With reference to FIG. 1 and FIG. 2, a self-compensated sealed rotary cone valve core comprises a valve sleeve; the valve sleeve is composed of a core cover 1 and a core base 2 connected to a lower part the core cover; an axial through hole is formed in an upper part of the core cover; the lower part of the axial through hole is provided with a reamed hole 12; an aperture of the reamed hole is greater than a diameter of an upper platform surface of a cone platform 31 of the core shaft, thereby ensuring that the core shaft can be effectively and automatically moved up after a sealing surface for matching a conical surface with the cone platform is worn; a rectangular bump 11 is arranged at the lower part of the core cover; a conical through hole is formed in the core base in an axial direction; the conical surface of the conical through hole is matched with the cone platform; a water outlet 21 is formed in a side wall of the core base; a rectangular groove 22 matched with the rectangular bump is formed in an upper end surface of the core base, to ensure that the core base does not rotate together with a core shaft; the core shaft 3 penetrating through the axial through hole of the core cover from bottom to top is arranged in the valve sleeve; the core shaft is a rigid whole member; an upper half part of the core shaft is a shaft rod provided with a screw rod part; a lower half part of the core shaft is provided with the cone platform closely matched with the conical surface; an inlet cavity 311 is arranged at the bottom of the cone platform; the inlet cavity is communicated with the through hole 32 formed in a side surface of the cone platform; meanwhile, the inlet cavity can be communicated with the water outlet 21 in the side wall of the core base after the inlet cavity is rotated by the core shaft, thereby forming a fluid access channel; the side surface of the cone platform of the core shaft is closely matched with the conical surface in the core base to form conical sealing; and in order to adjust the core shaft and make the core shaft have pre-tightening force, the screw rod part of the core shaft penetrating through the valve sleeve is sequentially sleeved by a limiting piece 5 and a spring gasket 6 and is locked with the valve sleeve by a screw nut 4 to realize pre-tightening sealing and rotary positioning of the rotary cone valve core.

In the present embodiment, in order to apply to different working environments, the core base is made of plastics to form soft sealing with the cone platform of the core shaft, for use in a normal temperature and normal pressure pipeline while reducing production cost; and when the core base is made of a rigid material and form hard sealing with the cone platform of the core shaft, the core base can be used for high temperature and high pressure environmental conditions.

Figure 3:
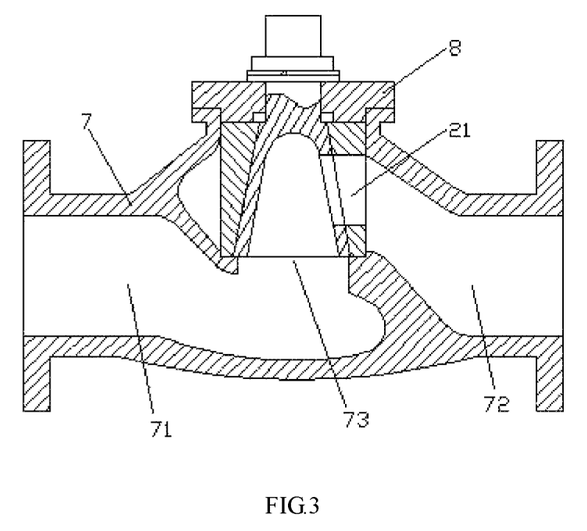
FIG. 3 is a straight-through valve applying a rotary cone valve core according to the present invention.

With reference to FIG. 3, a straight-through valve comprises a rotary cone valve core 8 and a valve body 7 arranged outside the rotary cone valve core; the valve body is provided with an inlet 71, an outlet 72 and a vertical mounting hole communicated with an upward-turning chamber 73 of the inlet; and the rotary cone valve core is completely assembled in the vertical mounting hole so that the inlet of the valve body is communicated with a water outlet 21 and the outlet of the valve body through an inlet cavity 31 of the rotary cone valve core. Fluid inflows from the inlet of the valve body and outflows from the outlet of the valve body through the cavity in the bottom of the rotary cone valve core and the water outlet in a side surface.

Figure 4:
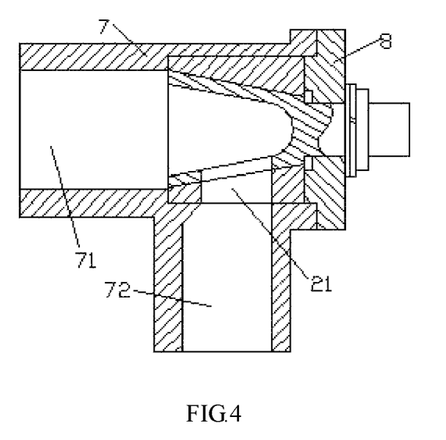
FIG. 4 is an angle valve applying a rotary cone valve core according to the present invention.

With reference to FIG. 4, an angle valve comprises a rotary cone valve core 8 and a valve body 7; the valve body 7 is provided with an inlet 71, an outlet 72 with a corner turning down at 90 degrees, and a laterally formed mounting hole; the rotary cone valve core is completely assembled in the mounting hole; and a water outlet of the rotary cone valve core faces the outlet of the valve body.

Figure 5:
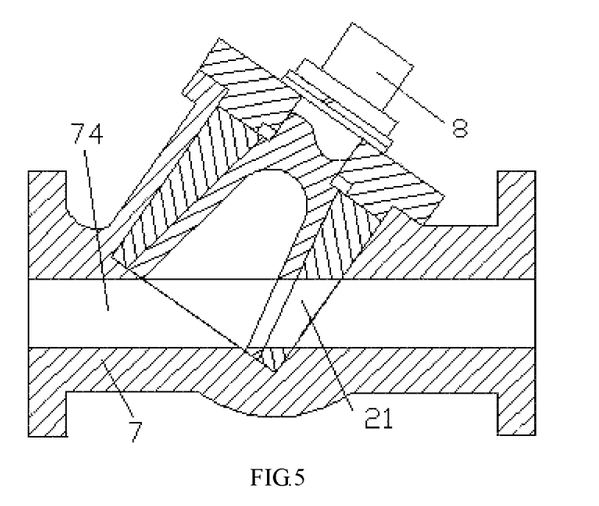
FIG. 5 is a straight-way valve applying a rotary cone valve core according to the present invention.

With reference to FIG. 5, a straight-way valve comprises a rotary cone valve core 8 and a valve body 7; the valve body is provided with a linear inlet and outlet channel 74; an oblique mounting hole communicated with the inlet and outlet channel is formed in the valve body; the rotary cone valve core is completely assembled in the oblique mounting hole; and a water outlet 21 of the rotary cone valve core and the inlet and outlet channel of the valve body are located on the same central axial line.

Figure 6:
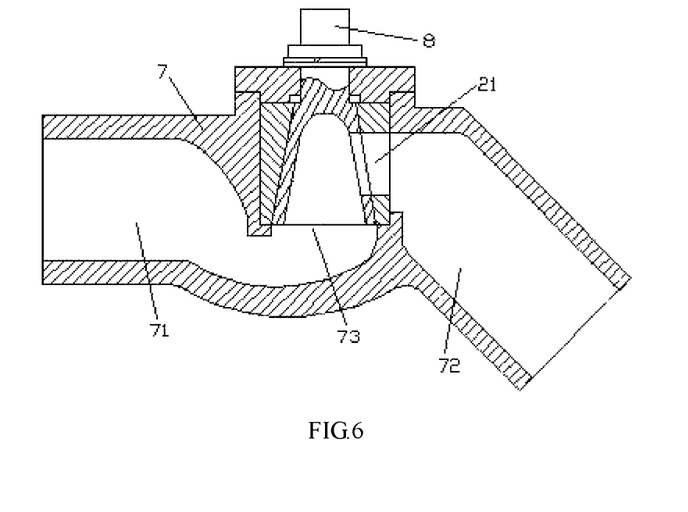
FIG. 6 is a faucet applying a rotary cone valve core according to the present invention.

With reference to FIG. 6, a faucet comprises a rotary cone valve core 8 and a valve body 7; the valve body is provided with an inlet 71, an outlet 72 and a vertical mounting hole communicated with an upward-turning chamber 73 of the inlet, and the outlet; and the rotary cone valve core is completely assembled in the vertical mounting hole.

In a preferred embodiment according to the present invention, the rotary cone valve core can also be applied to other valves, e.g., a three-way valve.

The above are merely preferred embodiments of the present invention. Those ordinary skilled in the art can design different types of valve cores and complete valves without creative work according to instructions of the present invention. Equivalent changes, modifications, replacements and variations made without departing from principles and spirits of the present invention within a scope of an application patent of the present invention should belong to the scope of the present invention.

What is claimed is:

1. A self-compensated sealed rotary cone valve core, comprising a valve sleeve, wherein an upper part of the valve sleeve is provided with an axial through hole; a lower chamber of the valve sleeve is provided with a big end down conical surface coaxial with the axial through hole; a core shaft penetrating through the axial through hole from bottom to top is arranged in the valve sleeve; the core shaft is a rigid whole piece; a lower part of the core shaft is provided with a big end down cone platform closely matched with the conical surface; an inlet cavity is formed in the cone platform; a through hole communicated with a water outlet in a side wall of the lower part of the valve sleeve is formed in a side wall of the inlet cavity; a screw rod part of the core shaft penetrating through the valve sleeve is sequentially sleeved by a limiting piece and a spring gasket and is locked by a screw nut to realize pre-tightening sealing and rotary positioning with the valve sleeve; the valve sleeve is composed of a core cover and a core base connected under the core cover; the core base is made of plastics to form soft sealing with the cone platform of the core shaft, or the core base is made of a rigid material to form hard sealing with the cone platform of the core shaft; an axial through hole is formed in the upper part of the core cover; the lower part of the axial through hole is provided with a reamed hole; an aperture of the reamed hole is greater than a diameter of an upper platform surface of the cone platform of the core shaft so that the core shaft is automatically moved up after a sealing surface between the conical surface and the cone platform is worn; a rectangular bump is arranged at the lower part of the core cover; a conical through hole coaxial with the axial through hole is formed in the core base in an axial direction; the water outlet is formed in the side wall of the core base; and a rectangular groove matched with the rectangular bump of the core cover is further formed in an upper end surface of the core base.

2. A straight-through valve, comprising the rotary cone valve core of claim 1 and a valve body arranged outside the rotary cone valve core; the valve body is provided with an inlet, an outlet and a vertical mounting hole; and the rotary cone valve core is completely assembled in the vertical mounting hole so that the inlet of the valve body is communicated with a water outlet and the outlet of the valve body through an inlet cavity of the rotary cone valve core.

3. An angle valve comprising the rotary cone valve core of claim 1; further comprising a valve body is provided with an inlet, an outlet with a corner turning down at 90 degrees, and a laterally formed mounting hole; the rotary cone valve core is completely assembled in the mounting hole; and a water outlet of the rotary cone valve core faces the outlet of the valve body.

4. A straight-way valve comprising the rotary cone valve core of claim 1; further comprising a valve body is provided with a linear inlet and outlet channel; an oblique mounting hole communicated with the inlet and outlet channel is formed in the valve body; the rotary cone valve core is completely assembled in the oblique mounting hole; and a water outlet of the rotary cone valve core and the inlet and outlet channel of the valve body are located on the same central axial line.

* * * * *